(12) United States Patent
Sobel et al.

(10) Patent No.: US 8,572,730 B1
(45) Date of Patent: Oct. 29, 2013

(54) SYSTEMS AND METHODS FOR REVOKING DIGITAL SIGNATURES

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 247 days.

(21) Appl. No.: 13/036,857

(22) Filed: Feb. 28, 2011

(51) Int. Cl.
*G06F 17/00* (2006.01)
(52) U.S. Cl.
USPC .................................... 726/22; 726/1
(58) Field of Classification Search
None
See application file for complete search history.

(56) References Cited

U.S. PATENT DOCUMENTS

| 7,739,278 | B1 * | 6/2010 | Sobel | 707/728 |
| 2007/0220259 | A1 * | 9/2007 | Pavlicic | 713/176 |
| 2008/0133907 | A1 * | 6/2008 | Parkinson | 713/158 |

OTHER PUBLICATIONS

Graf, Nicholas; U.S. Appl. No. 12/408,950; Systems and Methods for Using Tiered Signing Certificates to Manage the Behavior of Executables; filed Mar. 23, 2009.

* cited by examiner

*Primary Examiner* — Brandon Hoffman
*Assistant Examiner* — Nega Woldemariam
(74) *Attorney, Agent, or Firm* — ALG Intellectual Property, LLC

(57) ABSTRACT

A computer-implemented method for revoking digital signatures may include (1) identifying an executable file signed with a digital signature, (2) determining that the executable file is subject to a revocation check used to determine whether the digital signature has been revoked, (3) classifying the executable file based on at least one attribute of the executable file, (4) determining, based on the classification of the executable file, that the executable file is a member of a revocation group, wherein a status identifier associated with the revocation group indicates whether any member of the revocation group has a digital signature revocation, (5) determining, based on the status identifier associated with the revocation group, that the digital signature of the executable file has potentially been revoked, and then (6) performing the revocation check on the executable file. Various other methods, systems, and computer-readable media are also disclosed.

20 Claims, 8 Drawing Sheets

SYSTEMS AND METHODS FOR REVOKING DIGITAL SIGNATURES

BACKGROUND

Recently, researchers have determined that malicious computer programs ("malware") may be evolving faster than security-software programs can react. In an attempt to address this problem, security-software providers have begun migrating towards various "whitelisting" approaches. In many whitelisting systems, only applications or files that are contained within a defined list may be accessed or executed by a computing system. One of the more deterministic whitelisting approaches requires that executable files be signed by the publisher of the file and/or a trusted certificate authority. In this approach, the whitelisting system may only allow a computing system to access or execute files that can be verified as originating from a publisher that has been authenticated by a trusted certificate authority.

On occasion, a publisher of a file may wish to revoke the signature for the file, indicating that the file may no longer be considered trustworthy. Accordingly, some traditional technologies check the signature of a file for revocation when the file is first downloaded or otherwise introduced into a system. Unfortunately, this approach may fail to detect a signature revocation for a file that occurs after the file has already been introduced to the system. Furthermore, this approach may fail if a browser that downloads the file has been configured to skip revocation checks.

An alternate approach may involve simply checking the signature of a file for revocation before each attempted launch of the file. Unfortunately, this approach may introduce unwanted latency and consume a disproportionate amount of computing resources given the relative rarity of revocations. Accordingly, the instant disclosure identifies a need for additional and improved systems and methods for locally revoking digital signatures.

SUMMARY

As will be described in greater detail below, the instant disclosure generally relates to systems and methods for revoking digital signatures by bucketing executable files and determining whether an executable file requires a revocation check by determining whether a corresponding bucket includes any executable files whose digital signatures have been revoked. These systems and methods may then perform a revocation check on the executable file only if the corresponding bucket does include any executable files that have been revoked.

In some examples, the systems described herein may accomplish such a task by (1) identifying an executable file signed with a digital signature, (2) determining that the executable file is subject to a revocation check (used to determine, e.g., whether the digital signature has been revoked), (3) classifying the executable file based on at least one attribute of the executable file, (4) determining, based on the classification of the executable file, that the executable file is a member of a revocation group, where a status identifier associated with the revocation group indicates whether any member of the revocation group has a digital signature revocation, (5) determining, based on the status identifier associated with the revocation group, that the digital signature of the executable file has potentially been revoked, and then (6) performing the revocation check on the executable file.

The systems described herein may identify the executable file in a variety of contexts. For example, these systems may identify an attempt to execute the executable file and/or identify the executable file during a security scan.

The attribute used to classify the executable file may include any of a variety of attributes. In some examples, the attribute may include an attribute of the digital signature of the executable file. For example, the attribute of the digital signature may include a signatory of the digital signature.

In some examples, the systems described herein may also receive a list of status identifiers corresponding to a plurality of revocation groups that includes the revocation group. In these examples, these systems may periodically receive an updated version of the list of status identifiers and/or update the list of status identifiers whenever the list of status identifiers is updated on a revocation server.

In some examples, the status identifier may include a first timestamp indicating the latest time at which a digital signature of any member of the revocation group was revoked. In these examples, the systems described herein may determine that the digital signature of the executable file has potentially been revoked by identifying a second timestamp indicating when the digital signature was last checked for revocation and then determining that the second timestamp precedes the first timestamp.

The systems described herein may also determine, based on the revocation check, that the digital signature has been revoked. These systems may then perform a security action based on the determination that the digital signature has been revoked. For example, these systems may prevent execution of the executable file, quarantine the executable file, delete the executable file, and/or update the executable file.

As will be explained in greater detail below, by only performing a revocation check on an executable file when a status indicator of a corresponding revocation group indicates that the digital signature of the executable file may have been revoked, the systems and methods described herein may avoid costly and unnecessary revocation checks, potentially improving computing performance and user experience. Furthermore, in some examples these systems and methods may allow the verification of a digital signature preceding each launch of an executable file without requiring a full revocation check for each launch, thereby providing complete protection against unwanted launches of executable files with revoked digital signatures.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
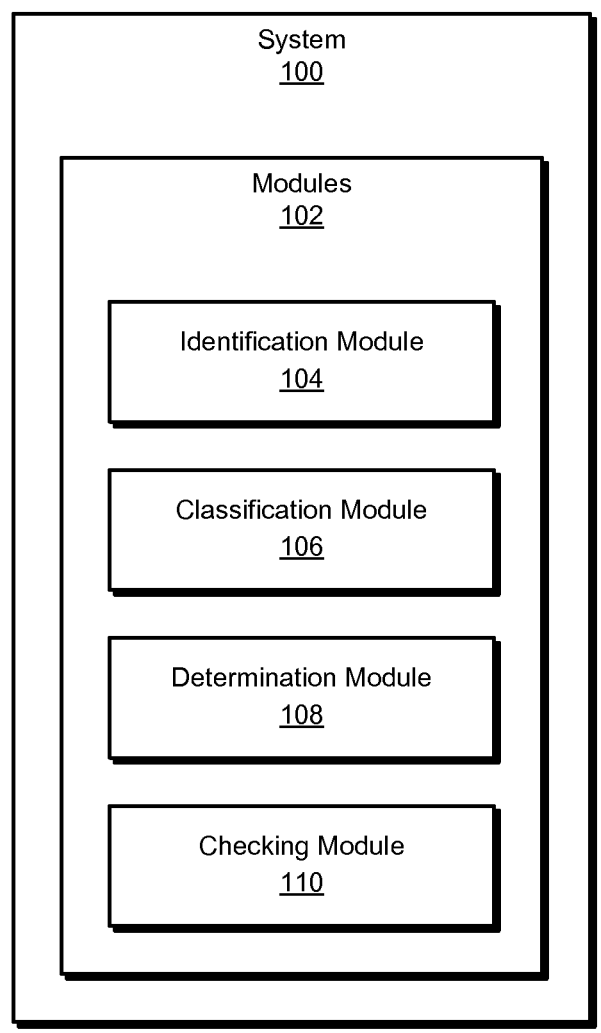
FIG. 1 is a block diagram of an exemplary system for revoking digital signatures.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
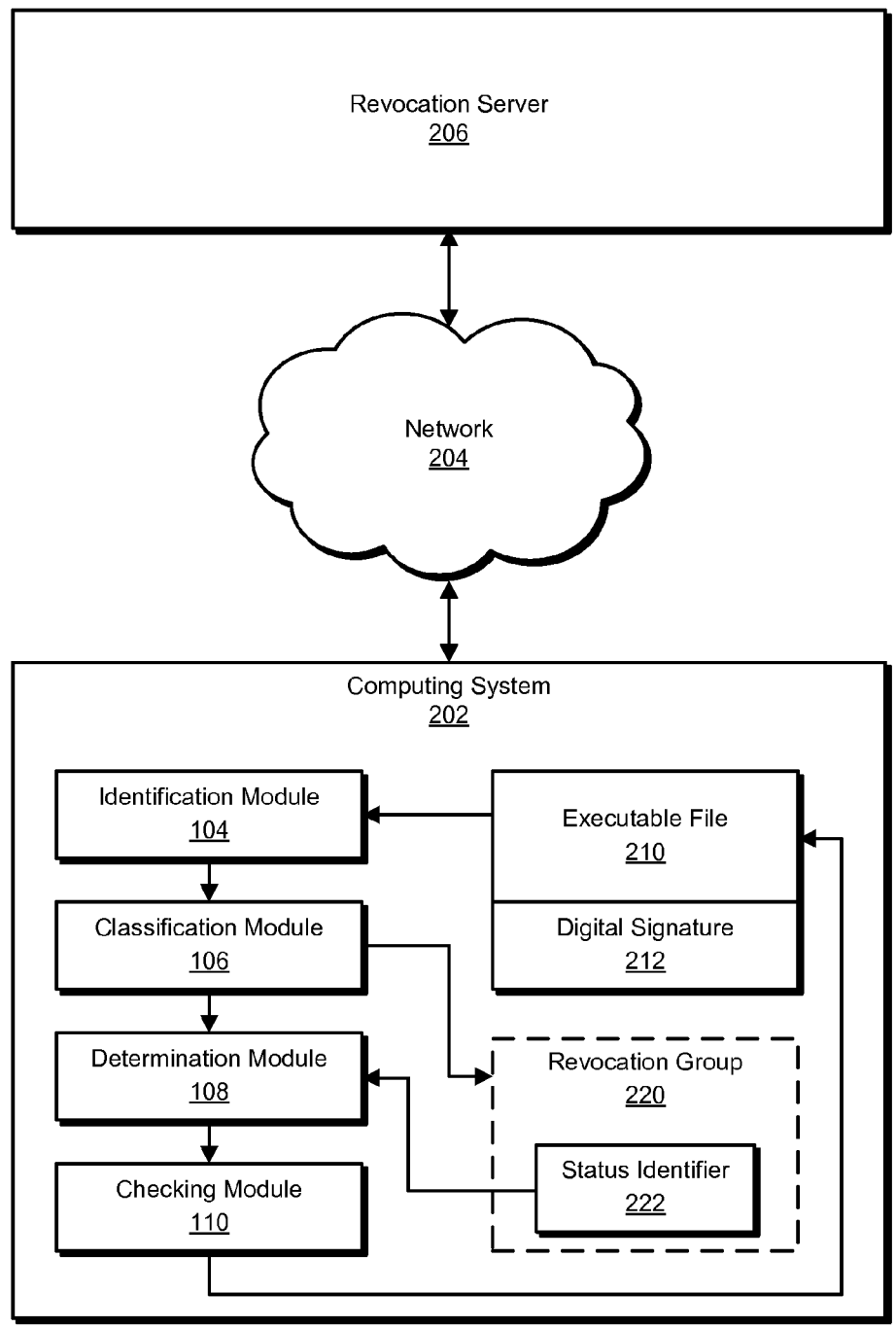
FIG. 2 is a block diagram of an exemplary system for revoking digital signatures.
Figure 3:
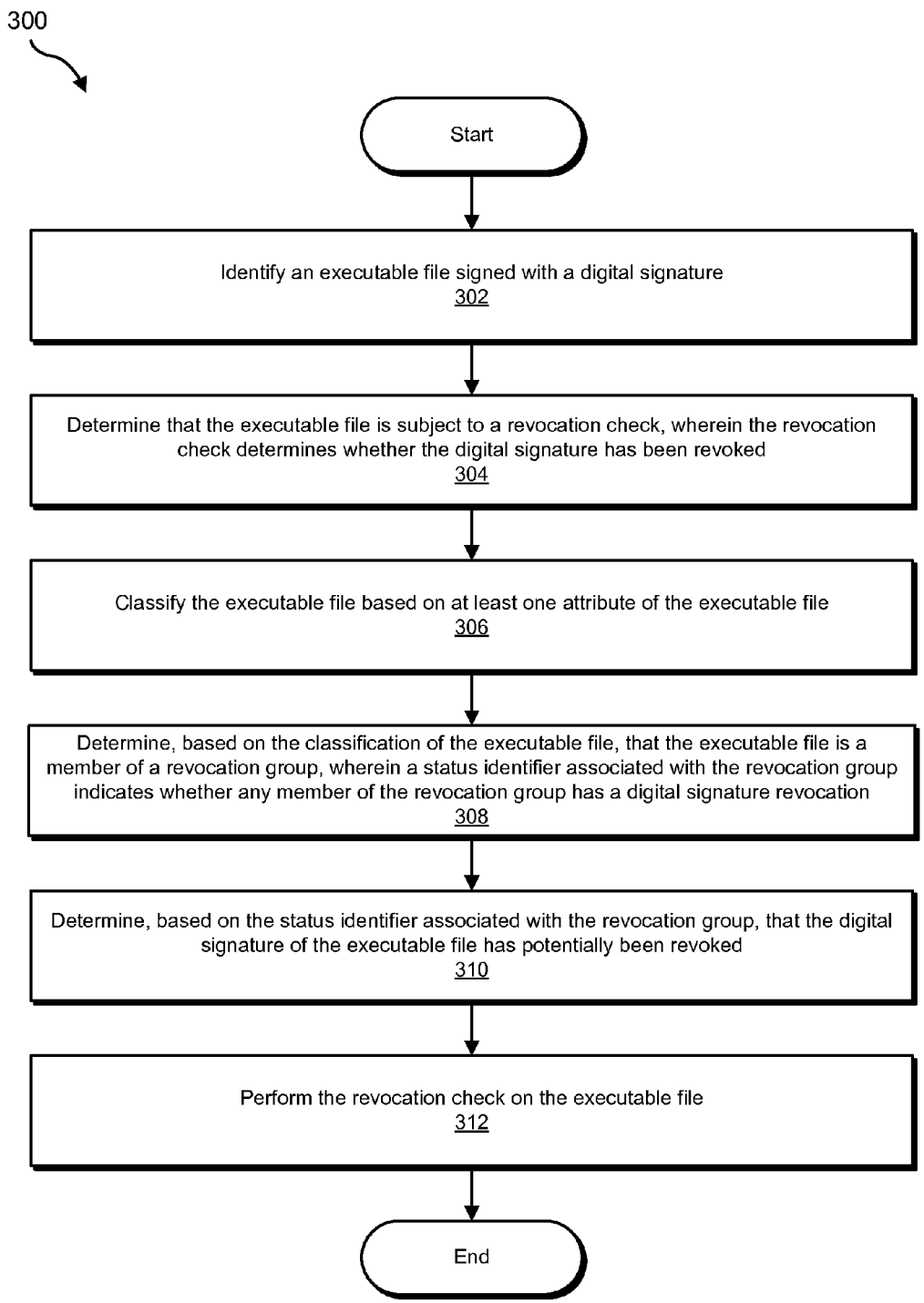
FIG. 3 is a flow diagram of an exemplary method for revoking digital signatures.
Figure 4:
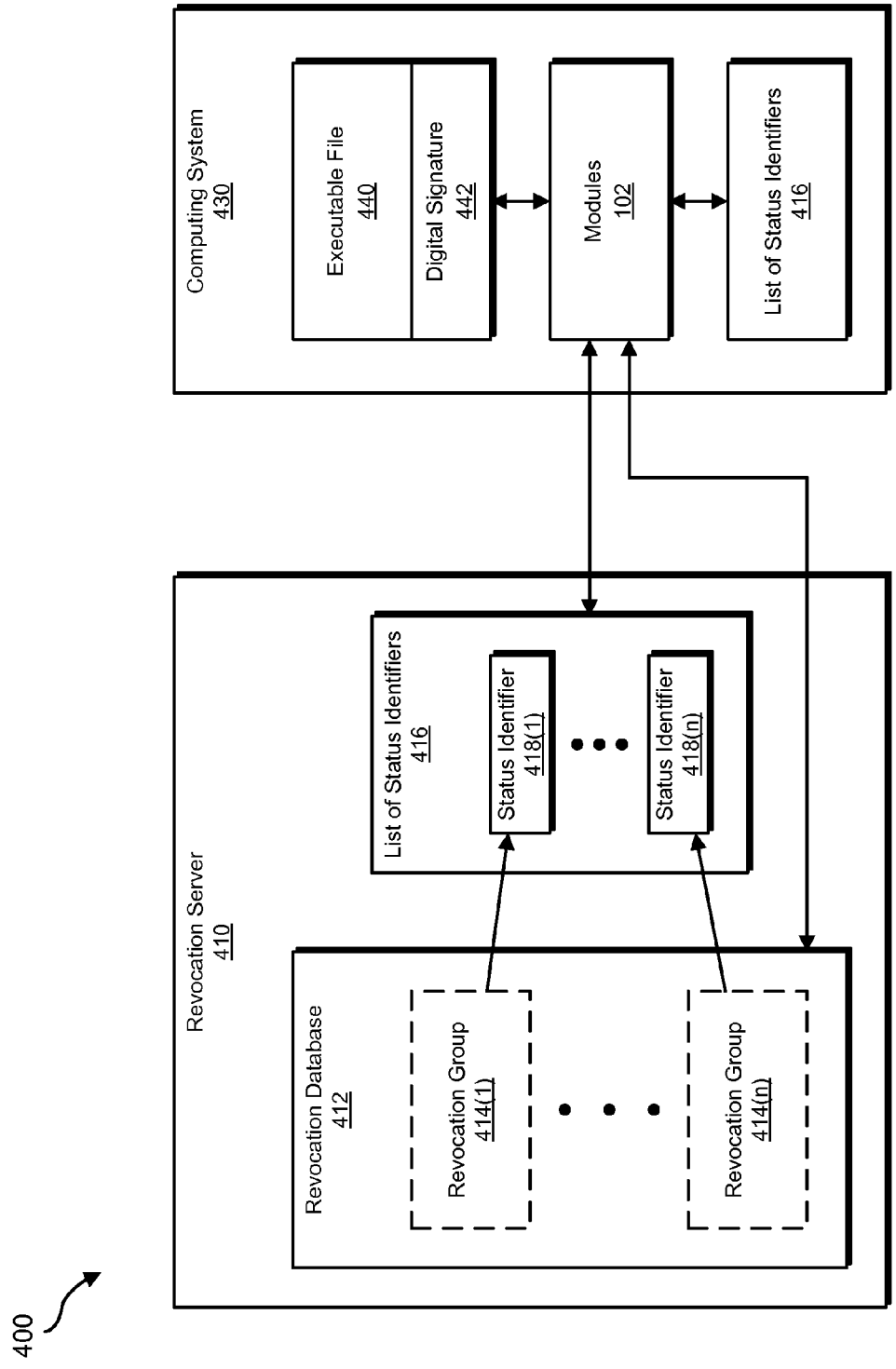
FIG. 4 is a block diagram of an exemplary system for revoking digital signatures.

The following will provide, with reference to FIGS. 1, 2, and 4, detailed descriptions of exemplary systems for revoking digital signatures. Detailed descriptions of corresponding computer-implemented methods will also be provided in connection with FIG. 3. Additionally, detailed descriptions of an exemplary plurality of revocation groups and an exemplary revocation timeline will be provided in connection with FIGS. 5 and 6, respectively. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for revoking digital signatures. As illustrated in this figure, exemplary system 100 may include one or more modules 102 for performing one or more tasks. For example, and as will be explained in greater detail below, exemplary system 100 may include an identification module 104 programmed to (1) identify an executable file signed with a digital signature and (2) determine that the executable file is subject to a revocation check (used to determine, e.g., whether the digital signature has been revoked). Exemplary system 100 may also include a classification module 106 programmed to (1) classify the executable file based on at least one attribute of the executable file and (2) determine, based on the classification of the executable file, that the executable file is a member of a revocation group. In this example, a status identifier associated with the revocation group may indicate whether any member of the revocation group has a digital signature revocation.

In addition, and as will be described in greater detail below, exemplary system 100 may include a determination module 108 programmed to determine, based on the status identifier associated with the revocation group, that the digital signature of the executable file has potentially been revoked. Exemplary system 100 may also include a checking module 110 programmed to perform the revocation check on the executable file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or revocation server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a revocation server 206 via a network 204.

In one embodiment, and as will be described in greater detail below, one or more modules 102 from FIG. 1 may program computing system 202 to revoke digital signatures by (1) identifying an executable file (e.g., an executable file 210) signed with a digital signature (e.g., a digital signature 212), (2) determining that the executable file is subject to a revocation check (e.g., determining that executable file 210 is subject to a revocation check that accesses revocation information from revocation server 206), (3) classifying the executable file based on at least one attribute of the executable file (e.g., such as an attribute of digital signature 212), (4) determining, based on the classification of the executable file, that the executable file is a member of a revocation group (e.g., a revocation group 220), where a status identifier associated with the revocation group (e.g., a status identifier 222) indicates whether any member of the revocation group has a digital signature revocation, (5) determining, based on the status identifier associated with the revocation group, that the digital signature of the executable file has potentially been revoked (e.g., that at least one member of revocation group 220 has had a digital signature revoked), and then (6) performing the revocation check on the executable file (e.g., by querying revocation server 206 with executable file 210).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Revocation server 206 generally represents any type or form of computing device that is capable of providing revocation information. Examples of revocation server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing system 202 and revocation server 206.

FIG. 3 is a flow diagram of an exemplary computer-implemented method 300 for revoking digital signatures. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an executable file signed with a digital signature. For example, at step 302 identification module 104 may, as part of computing system 202 in FIG. 2, identify executable file 210 signed with digital signature 212.

As used herein, the phrase "executable file" may refer to any executable object that may be digitally signed. Examples of executable files include portable executable files, native executable files, library files (such as dynamic linked libraries and dynamic shared objects), bytecode files executed within an interpreter, and/or script files.

As used herein, the phrase "digital signature" may refer to any code signing scheme and/or other scheme by which an entity may authenticate or validate an executable file. Accordingly, "digital signature" may refer to a digital signature and/or a digital certificate. For example, a publisher of an executable file and/or a security company may issue a digital certificate under a trusted certificate authority to verify that the executable file is legitimate and/or safe. In some examples, digital signatures may use public-key cryptography as a mechanism to demonstrate that the executable file was signed by an authoritative party. A digital signature to an executable file may be embedded in the executable file and/or exist as a separate file and/or data structure.

Identification module 104 may identify the executable file in a variety of contexts. For example, identification module 104 may identify the executable file during an attempt to launch the executable file. In some examples, identification module 104 may intercept the attempt to launch the executable file (e.g., until the systems describe herein determine whether the digital signature of the executable file is still valid). Additionally or alternatively, identification module 104 may identify the executable file during a security scan. For example, identification module 104 may be programmed to run as part of a background process that checks the validity of digital signatures of executable files.

FIG. 4 is a diagram of an exemplary system 400 for revoking digital signatures. As illustrated in FIG. 4, a computing system 430 may include an executable file 440. Accordingly, identification 104 may, as part of modules 102 on computing system 430, identify executable file 440 with a digital signature 442.

Returning to FIG. 3, at step 304 one or more of the systems described herein may determine that the executable file is subject to a revocation check used to determine whether the digital signature has been revoked. For example, at step 304 identification module 104 may, as part of computing system 202 in FIG. 2, determine that executable file 210 is subject to a revocation check. Using FIG. 4 as an example, identification module 104 may determine that executable file 440 is subject to a revocation check.

As used herein, the phrase "revocation check" may refer to any process for verifying that a digital signature is still valid, or, alternatively, determining that a digital signature has been revoked. In some examples, the revocation check may entail querying a database on a remote server to determine whether the digital signature has been revoked. Accordingly, the systems and methods described herein may be directed, in part, toward avoiding unnecessary revocation checks in order to avoid unnecessarily consuming computing resources and/or causing latency for a user who would otherwise wait for the revocation check to complete.

Identification module 104 may determine that the executable file is subject to the revocation check in any suitable manner. For example, identification module 104 may determine that the executable file is subject to the revocation check based on a configuration for a security scan. Additionally or alternatively, identification module 104 may determine that the executable file is subject to the revocation check based on a security setting for launching executable files. In some examples, identification module 104 may determine that the executable file is subject to the revocation check simply by successfully identifying the executable file.

At step 306, one or more of the systems described herein may classify the executable file based on at least one attribute of the executable file. For example, at step 306 classification module 106 may, as part of computing system 202 in FIG. 2, classify executable file 210. Using FIG. 4 as an example, classification module 106 may classify executable file 440.

Classification module 106 may classify the executable file using any of a variety of attributes of the executable file. For example, classification module 106 may use a hash of the executable file, a hash of a predetermined section of the executable file, a name of the executable file, etc. In some examples, classification module 106 may use an attribute of the digital signature to classify the executable file. For example, classification module 106 may classify the executable file based on a signatory of the digital signature (e.g., a publisher of the executable file, such as "MICROSOFT," "ADOBE," "SYMANTEC," etc.). Additionally or alternatively, classification module 106 may classify the executable file based on a publisher group (e.g., grouping publishers alphabetically, by hash buckets, etc.). In some examples, classification module 106 may further classify the executable file based on a date range into which the expiration date of an accompanying digital certificate falls. Generally, classification module 106 may classify the executable file using any deterministic method that reliably maps an instance of the executable file its classification.

In some examples, classification module 106 may combine and/or manipulate multiple attributes of the executable file in the course of classifying the executable file. Additionally or alternatively, classification module 106 may extract one or more attributes of the executable file and store them as extended metadata for the executable file.

At step 308, one or more of the systems described herein may determine, based on the classification of the executable file, that the executable file is a member of a revocation group, where a status identifier associated with the revocation group indicates whether any member of the revocation group has a digital signature revocation. For example, at step 308 classification module 106 may, as part of computing system 202 in FIG. 2, determine that executable file 210 is a member of revocation group 220 with associated status identifier 222. Using FIG. 4 as an example, classification module 106 may determine that executable file 440 is a member of a revocation group 414(1) with an associated status identifier 418(1).

As used herein, the term "revocation group" may refer to any group of executable files with one or more attributes in common (e.g., the publisher, a publisher group, or any other classification such as those discussed earlier). As mentioned above, the revocation group may have an associated status identifier that indicates whether any member of the revocation group has a digital signature revocation. For example, a security vendor may gather information on digital signature revocations for executable files. Instead of merely forwarding all digital signature revocations to each subscribing client, the security vendor may classify the executable files into revocation groups (e.g., using the same criteria used by classification module 106). The security vendor may then disseminate status identifiers for each revocation group that indicates whether a digital signature revocation has occurred within the revocation group.

Figure 5:
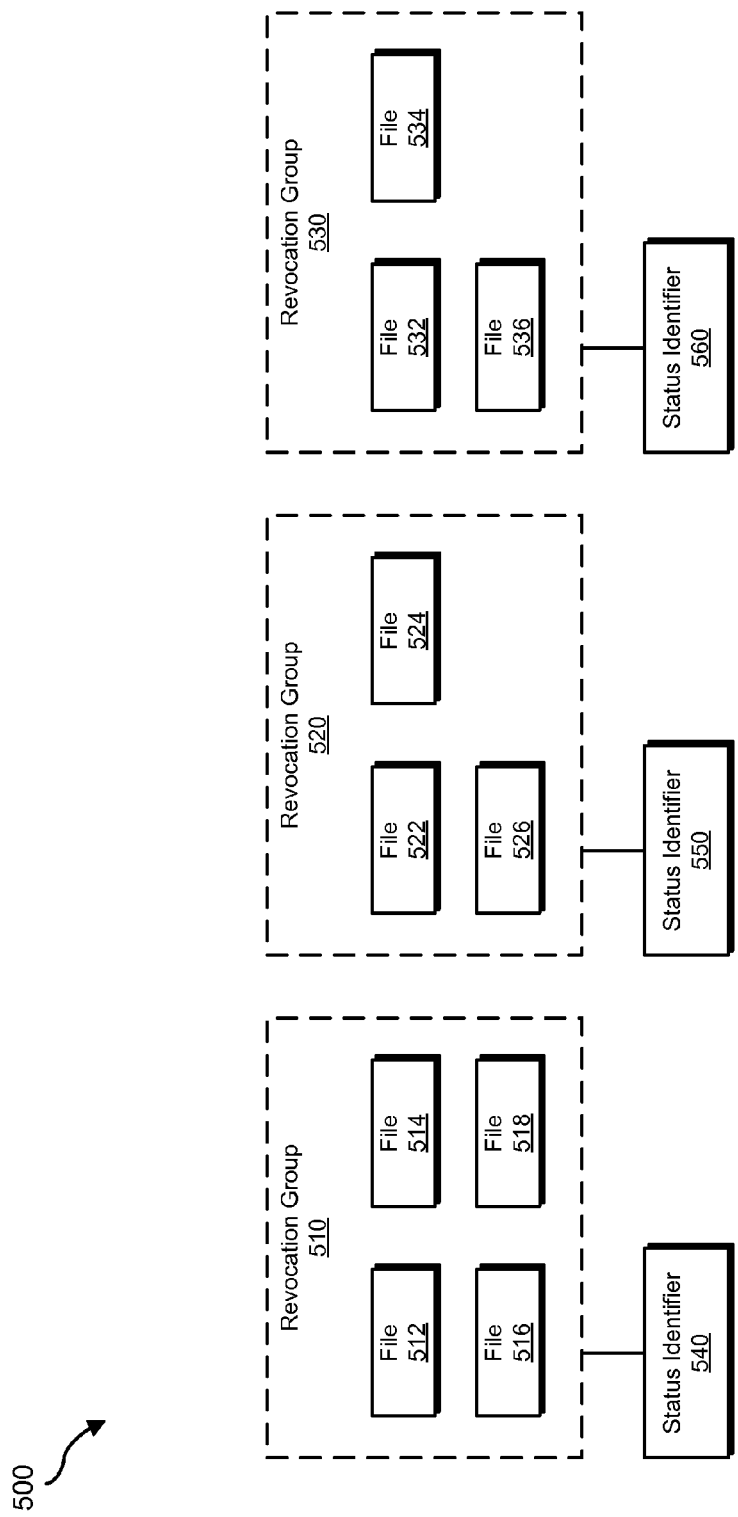
FIG. 5 is a block diagram of an exemplary plurality of revocation groups.

FIG. 5 illustrates a plurality of revocation groups 500. As shown in FIG. 5, a revocation group 510 may include files 512, 514, 516, and 518 and may be associated with a status identifier 540. Likewise, a revocation group 520 may include files 522, 524, and 526 and may be associated with a status identifier 550. Additionally, a revocation group 530 may include files 532, 534, and 536 and may be associated with a status identifier 560. Status identifier 540 may indicate whether a digital signature for any file in revocation group 510 has been revoked. Similarly, status identifiers 550 and 560 may indicate whether a digital signature for any file in revocation groups 520 and 530 have been revoked, respectively. If file 512 is a file published by MICROSOFT and revocation group 510 corresponds to executable files published by MICROSOFT, classification module 106 may determine that file 512 belongs to revocation group 510 with the associated status identifier 540.

Returning to step 308 of FIG. 3, the status identifier may include any suitable indicator that a member of the revocation group has a digital signature revocation. For example, the status identifier may simply include a binary indicator, indicating either that no member of the revocation group has a digital signature revocation or that at least one member of the revocation group has a digital signature revocation. Additionally or alternatively, the status identifier may include a timestamp indicating the latest time at which a digital signature of any member of the revocation group was revoked. As will be described in greater detail below in the discussion of step 310, systems described herein may use the timestamp as a point of comparison to ensure that the executable file is checked if it hasn't been checked since the time indicated by the timestamp of the revocation group.

Returning to FIG. 3, at step 310 one or more of the systems described herein may determine, based on the status identifier associated with the revocation group, that the digital signature of the executable file has potentially been revoked. For example, at step 310 determination module 108 may, as part of computing system 202 in FIG. 2, determine, based on status identifier 222, that digital signature 212 of executable file 210 has potentially been revoked.

Determination module 108 may perform step 310 in any suitable manner. For example, determination module 108 may determine that the digital signature of the executable file has potentially been revoked by determining that the status identifier indicates that a member of the revocation group has been revoked. Using FIG. 5 as an example, file 512 may have had its digital signature revoked. Accordingly, status identifier 540 may indicate that a member of revocation group 510 has a digital signature revocation. Additionally, the systems described herein may determine that file 512 is subject to a revocation check and classify file 512 as a member of revocation group 510. Determination module 108 may determine that the digital signature of file 512 has potentially been revoked by examining status identifier 540.

In some examples, determination module 108 may consult a local copy of the status identifier to determine that a member of the revocation group has had its digital signature revoked. For example, determination module 108 may receive a list of status identifiers corresponding to a plurality of revocation groups that includes the revocation group of the executable file. In some examples, determination module 108 may keep the list of status identifiers current. For example, determination module 108 may periodically receive an updated version of the list of status identifiers (e.g., once a day, once a week, etc.). Additionally or alternatively, determination module 108 may receive an updated version of the list of status identifiers during system idle time. In some examples, determination module 108 may update the list of status identifiers whenever the list of status identifiers is updated on a revocation server (e.g., the revocation server may push the update to subscribing clients).

Using FIG. 4 as an example, a revocation server 410 in communication with computing system 430 may include a revocation database 412. Revocation database 412 may include information on all known digital signature revocations for executable files (e.g., digital signature revocations for digital signatures and/or executable files tracked by a security vendor operating revocation server 410). The executable files tracked in revocation database 412 may be organizable into revocation groups 414(1)-(n). When revocation database 412 is updated with new revocation information, revocation server 410 may also update a list of status identifiers 416, including status identifiers 418(1)-(n). Status identifiers 418(1)-(n) may indicate which of corresponding revocation groups 414(1)-(n) have digital signature revocations. In some examples, determination module 108 on computing system 430 may download the list of status identifiers 416 to computing system 430. In some examples, determination module 108 may update the list of status identifiers 416 periodically (e.g., by downloading a new copy and/or a change list on a periodic basis). Additionally or alternatively, revocation server 410 may push updates to the list of status identifiers 416 to determination module 108 as the updates happen.

Returning to step 310 in FIG. 3, as mentioned earlier, the status identifier may include a first timestamp indicating the latest time at which a digital signature of any member of the revocation group was revoked. Accordingly, determination module 108 may use the first timestamp as a point of comparison to ensure that the executable file is checked if it hasn't been checked since the time indicated by the timestamp of the revocation group. For example, determination module 108 may identify a second timestamp indicating when the digital signature was last checked for revocation. Determination module 108 may then determine that the second timestamp precedes the first timestamp. In this example, since the revocation group has a new revocation since the executable file was last checked, it is possible that the digital signature for the executable file has been revoked.

Figure 6:
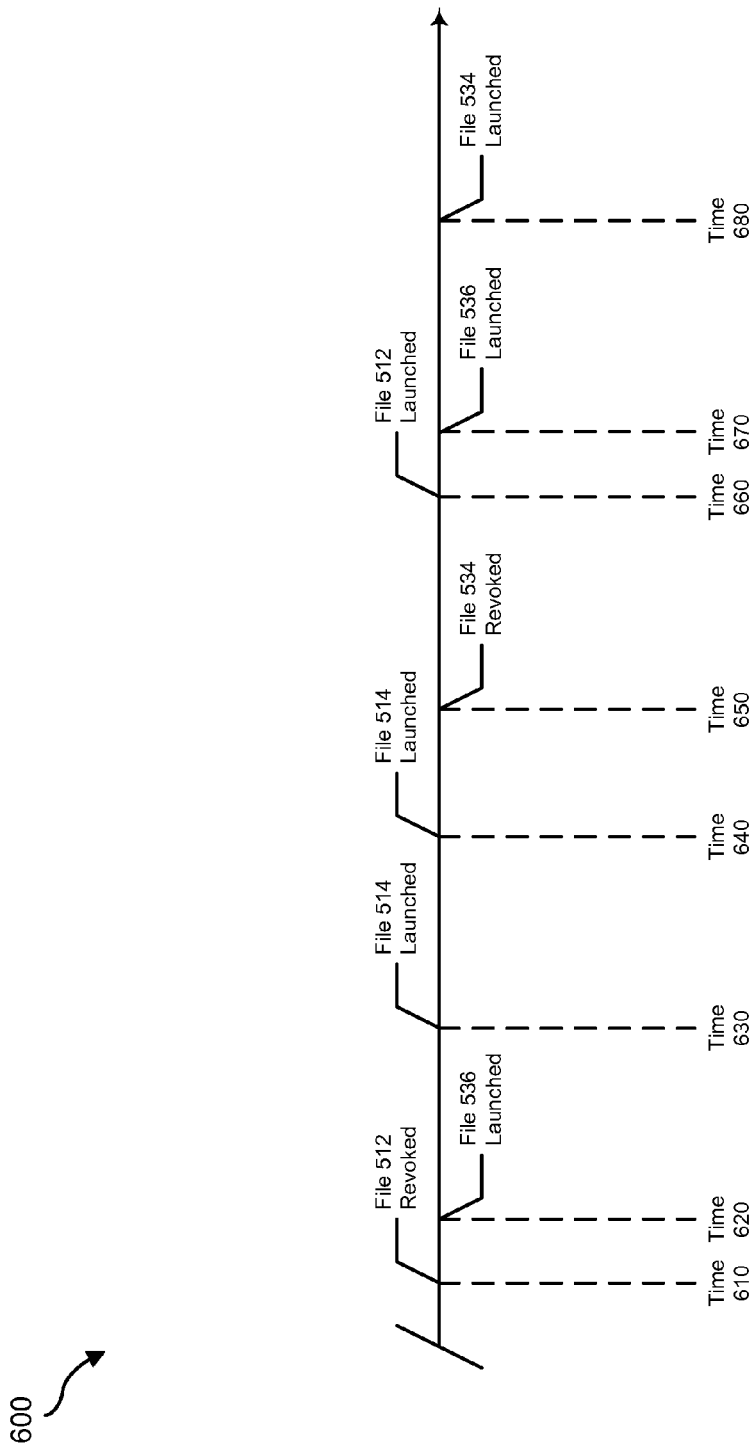
FIG. 6 is a block diagram of an exemplary revocation timeline.

FIG. 6 illustrates a revocation timeline 600. As shown in FIG. 6, at a time 610 file 512 (e.g., from FIG. 5) may have its digital signature revoked. According to some examples, status identifier 540 would therefore indicate time 610 as the latest revocation for revocation group 510.

At a time 620, file 536 may be launched. Assuming no revocations before time 610, status identifier 560 of revocation group 530 may indicate no revocations for revocation group 530. The systems described herein may therefore allow the launch of file 536 without an individual revocation check for the digital signature of file 536.

At a time 630, file 514 may be launched. Since status identifier 540 indicates time 610 as the time of the latest revocation for revocation group 510, and since file 514 may not have been checked for revocation since time 610, determination module 108 may determine that the digital signature for file 514 has potentially been revoked. Upon checking the digital signature for file 514, the systems described herein may associate a timestamp with file 514 indicating that file 514 was checked at time 630.

At a time 640, file 514 may be launched again. Since status identifier 540 still indicates time 610 as the time of the latest revocation for revocation group 510 but file 514 is now associated with a timestamp indicating that file 514 was checked at time 630, file 514 may not be checked for revocation again at time 640.

At time 650, the digital signature for file 534 may be revoked. Accordingly, status identifier 560 may indicate time 650 as the time of the latest revocation for revocation group 530.

At a time 660, file 512 may be launched. Since status identifier 540 indicates time 610 as the time of the latest revocation for revocation group 510, and since file 512 may not have been checked for revocation since time 610, determination module 108 may determine that the digital signature for file 512 has potentially been revoked.

At a time 670, file 536 may be launched again. However, since status identifier 560 now indicates time 650 as the time of the latest revocation for revocation group 530, determination module 108 may determine that the digital signature for file 536 may potentially be revoked.

At a time 680, file 534 may be launched. Again, since status identifier 560 now indicates time 650 as the time of the latest revocation for revocation group 530, determination module 108 may determine that the digital signature for file 534 may potentially be revoked.

Returning to FIG. 3, at step 312 one or more of the systems described herein may perform the revocation check on the executable file. For example, at step 312 checking module 110 may, as part of computing system 202 in FIG. 2, perform the revocation check on executable file 210. Using FIG. 4 as an additional example, at step 312 checking module 110 may, as part of computing system 430, perform the revocation check on executable file 440 (by, e.g., querying revocation database 412 on revocation server 410).

Checking module 110 may perform step 312 in any suitable manner. For example, checking module 110 may query a remote server (e.g., maintained by a security vendor) to determine whether the digital signature for the executable file has been revoked. Generally, checking module 110 may perform the revocation check on the executable file in response to the determination that the digital signature of the executable file has potentially been revoked. For example, checking module 110 may perform revocation checks only for executable files whose digital signatures have potentially been revoked as determined according to the processes described herein. After step 312 method 300 may terminate.

In some examples the systems and methods described herein may also determine, based on the revocation check, that the digital signature has been revoked. For example, a revocation server may respond to a query regarding the executable file that the digital signature for the executable file has been revoked. In response, these systems and methods may also perform a security action based on the determination that the digital signature has been revoked. In some examples, the security action may include preventing execution of the executable file. For example, if identification module 104 identified the executable file in response to an attempted launch of the executable file, the systems and methods described herein may block and/or terminate the launch of the executable file. Additionally or alternatively, the security action may include quarantining the executable file and/or deleting the executable file. Generally, the security action may include any action necessary to prevent the executable file from posing a threat to a host system given the revocation of its digital signature. In some examples, the security action may include updating the executable file. For example, the digital signature may have been revoked from the executable file due to a security issue (e.g., a backdoor discovered within the otherwise legitimate executable file) and a newer version of the executable file may include a fix and a valid digital signature.

Upon completion of step 312, exemplary method 300 in FIG. 3 may terminate.

As explained above, by only performing a revocation check on an executable file when a status indicator of a corresponding revocation group indicates that the digital signature of the executable file may have been revoked, the systems and methods described herein may avoid costly and unnecessary revocation checks, potentially improving computing performance and user experience. Furthermore, in some examples these systems and methods may allow the effective verification of a digital signature preceding each launch of an executable file without requiring a full revocation check at each launch, thereby providing complete and efficient protection against unwanted launches of executable files with revoked digital signatures.

Figure 7:
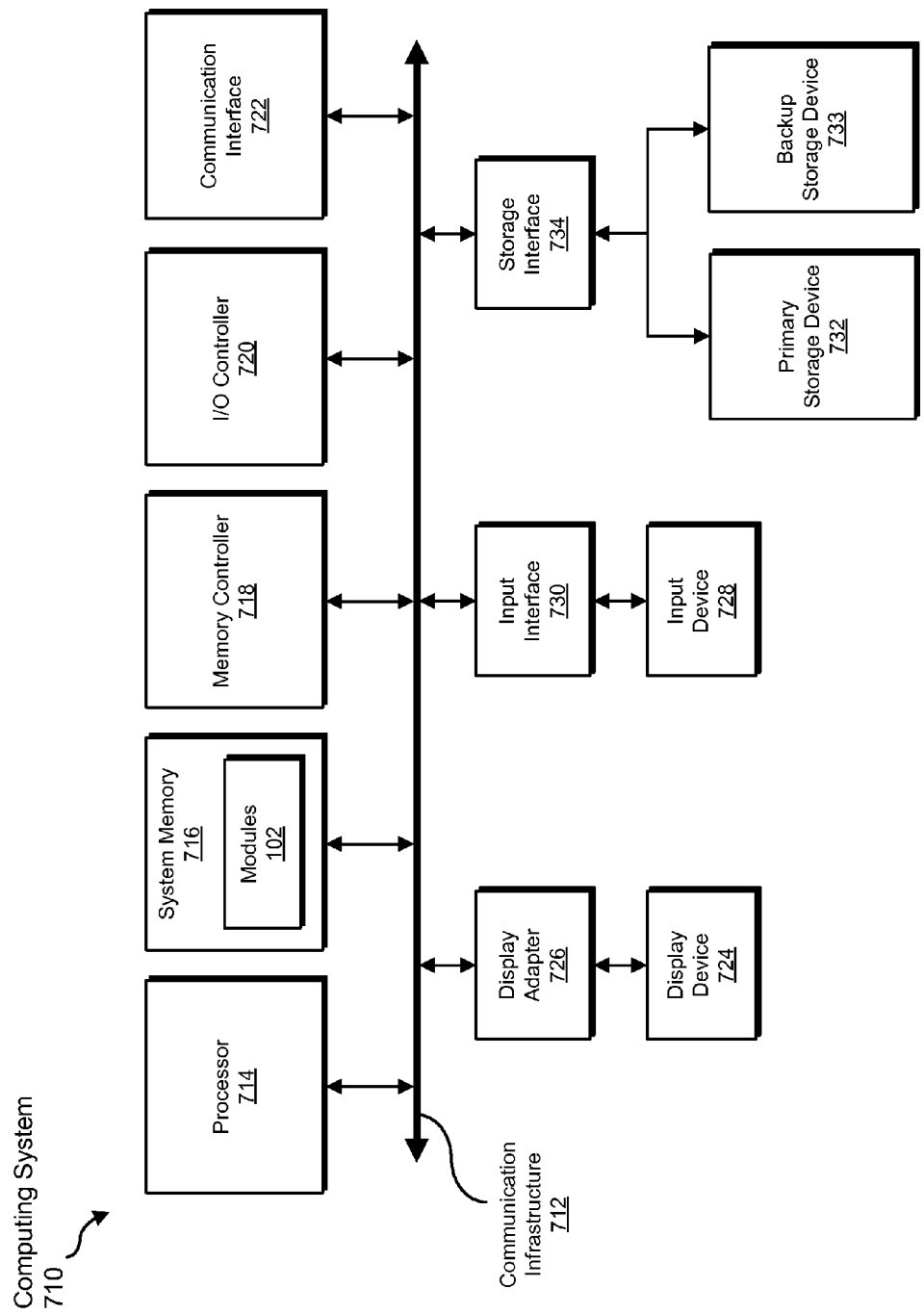
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, determining, classifying, receiving, updating, performing, preventing, quarantining, and/or deleting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, determining, classifying, receiving, updating, performing, preventing, quarantining, and/or deleting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, determining, classifying, receiving, updating, performing, preventing, quarantining, and/or deleting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, determining, classifying, receiving, updating, performing, preventing, quarantining, and/or deleting steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, determining, classifying, receiving, updating, performing, preventing, quarantining, and/or deleting steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, determining, classifying, receiving, updating, performing, preventing, quarantining, and/or deleting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
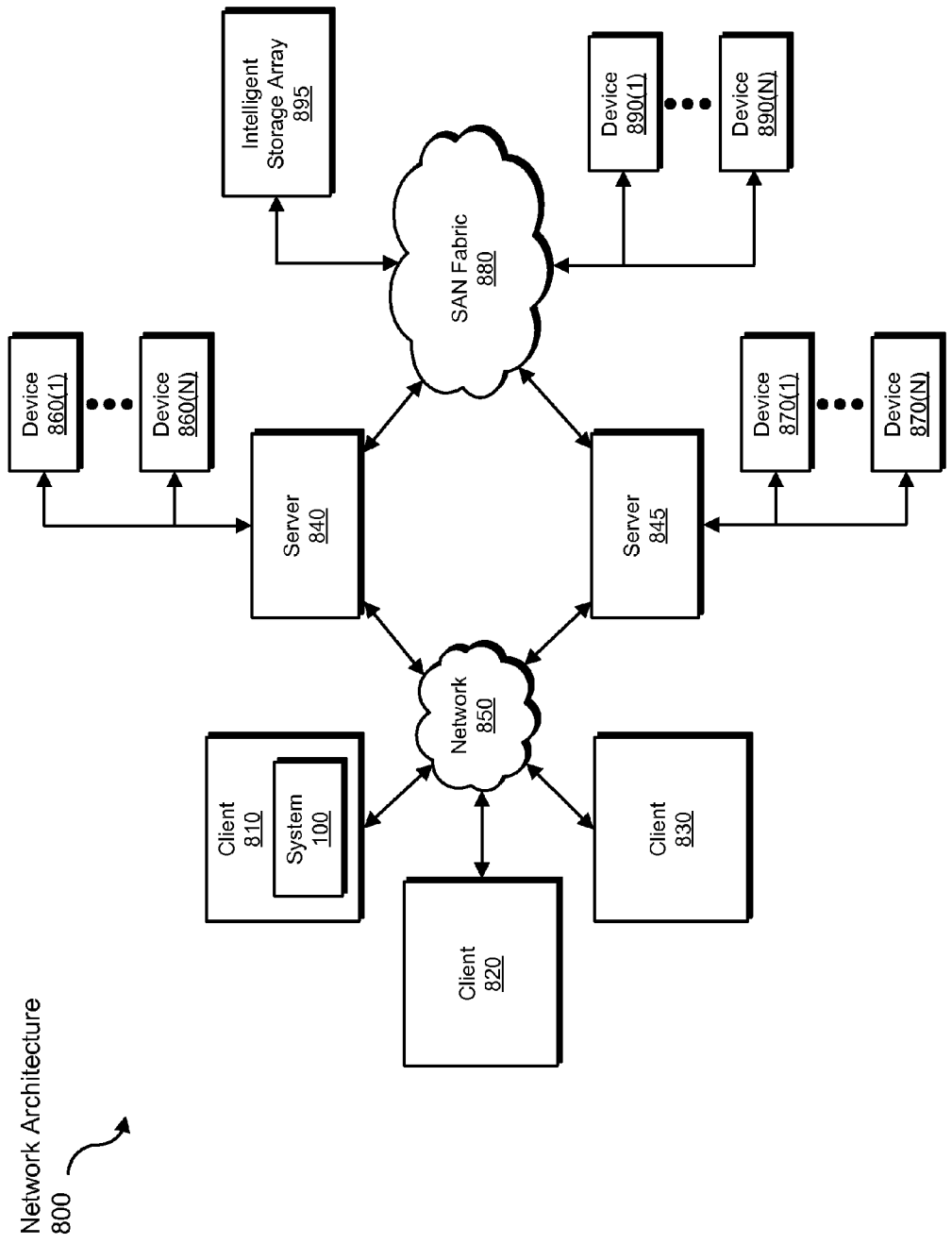
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, determining, classifying, receiving, updating, performing, preventing, quarantining, and/or deleting steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for revoking digital signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for effectively and efficiently revoking digital signatures.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for revoking digital signatures, at least a portion of the method being performed by a computing device comprising at least one processor, the method comprising:
    identifying an executable file signed with a digital signature;
    determining that the executable file is subject to a revocation check, wherein the revocation check determines whether the digital signature has been revoked;
    classifying the executable file based on at least one attribute of the executable file;
    determining, based on the classification of the executable file, that the executable file is a member of a revocation group, wherein a status identifier of the revocation group indicates whether any member of the revocation group has a digital signature revocation;
    determining that the status identifier of the revocation group indicates that at least one member of the revocation group has a digital signature revocation;
    performing, based at least in part on determining that the status identifier of the revocation group indicates that at least one member of the revocation group has a digital signature revocation, the revocation check on the executable file.

2. The computer-implemented method of claim 1, further comprising:
    determining, based on the revocation check, that the digital signature has been revoked;
    performing a security action based on the determination that the digital signature has been revoked.

3. The computer-implemented method of claim 2, wherein the security action comprises at least one of:
    preventing execution of the executable file;
    quarantining the executable file;
    deleting the executable file;
    updating the executable file.

4. The computer-implemented method of claim 1, wherein the attribute of the executable file comprises an attribute of the digital signature.

5. The computer-implemented method of claim 4, wherein the attribute of the digital signature comprises a signatory of the digital signature.

6. The computer-implemented method of claim 1, where identifying the executable file comprises at least one of:
    identifying an attempt to execute the executable file;
    identifying the executable file during a security scan.

7. The computer-implemented method of claim 1, wherein:
    the status identifier of the revocation group comprises a first timestamp indicating the latest time at which a digital signature of any member of the revocation group was revoked;
    performing the revocation check on the executable file is further based at least in part on:
        identifying a second timestamp indicating when the digital signature was last checked for revocation;
        determining that the second timestamp precedes the first timestamp.

8. The computer-implemented method of claim 1, further comprising receiving a list of status identifiers corresponding to a plurality of revocation groups, the plurality of revocation groups comprising the revocation group.

9. The computer-implemented method of claim 8, where receiving the list of status identifiers comprises at least one of:
    periodically receiving an updated version of the list of status identifiers;
    updating the list of status identifiers whenever the list of status identifiers is updated on a revocation server.

10. A system for revoking digital signatures, the system comprising:
    an identification module programmed to:
        identify an executable file signed with a digital signature;
        determine that the executable file is subject to a revocation check, wherein the revocation check determines whether the digital signature has been revoked;
    a classification module programmed to:
        classify the executable file based on at least one attribute of the executable file;
        determine, based on the classification of the executable file, that the executable file is a member of a revocation group, wherein a status identifier of the revocation group indicates whether any member of the revocation group has a digital signature revocation;

a determination module programmed to determine that the status identifier of the revocation group indicates that at least one member of the revocation group has a digital signature revocation;

a checking module programmed to perform, based at least in part on determining that the status identifier of the revocation group indicates that at least one member of the revocation group has a digital signature revocation, the revocation check on the executable file;

at least one processor configured to execute the identification module, the classification module, the determination module, and the checking module.

11. The system of claim 10, wherein the checking module is further programmed to:

determine, based on the revocation check, that the digital signature has been revoked;

perform a security action based on the determination that the digital signature has been revoked.

12. The system of claim 11, wherein the security action comprises at least one of:

preventing execution of the executable file;
quarantining the executable file;
deleting the executable file;
updating the executable file.

13. The system of claim 10, wherein the attribute of the executable file comprises an attribute of the digital signature.

14. The system of claim 13, wherein the attribute of the digital signature comprises a signatory of the digital signature.

15. The system of claim 10, where the identification module is programmed to identify the executable file by at least one of:

identifying an attempt to execute the executable file;
identifying the executable file during a security scan.

16. The system of claim 10, wherein:

the status identifier of the revocation group comprises a first timestamp indicating the latest time at which a digital signature of any member of the revocation group was revoked;

the checking module is programmed to perform the revocation check on the executable file based at least in part on:

identifying a second timestamp indicating when the digital signature was last checked for revocation;

determining that the second timestamp precedes the first timestamp.

17. The system of claim 10, wherein the determination module is further programmed to receive a list of status identifiers corresponding to a plurality of revocation groups, the plurality of revocation groups comprising the revocation group.

18. The system of claim 17, where the determination module is programmed to receive the list of status identifiers by at least one of:

periodically receiving an updated version of the list of status identifiers;

updating the list of status identifiers whenever the list of status identifiers is updated on a revocation server.

19. A non-transitory computer-readable-storage medium comprising one or more computer-executable instructions that, when executed by at least one processor of a computing device, cause the computing device to:

identify an executable file signed with a digital signature;

determine that the executable file is subject to a revocation check, wherein the revocation check determines whether the digital signature has been revoked;

classify the executable file based on at least one attribute of the executable file;

determine, based on the classification of the executable file, that the executable file is a member of a revocation group, wherein a status identifier of the revocation group indicates whether any member of the revocation group has a digital signature revocation;

determine that the status identifier of the revocation group indicates that at least one member of the revocation group has a digital signature revocation;

perform, based at least in part on determining that the status identifier of the revocation group indicates that at least one member of the revocation group has a digital signature revocation, the revocation check on the executable file.

20. The non-transitory computer-readable-storage medium of claim 19, wherein the one or more computer-executable instructions further cause the computing device to:

determine, based on the revocation check, that the digital signature has been revoked;

perform a security action based on the determination that the digital signature has been revoked.

* * * * *